UNITED STATES PATENT OFFICE.

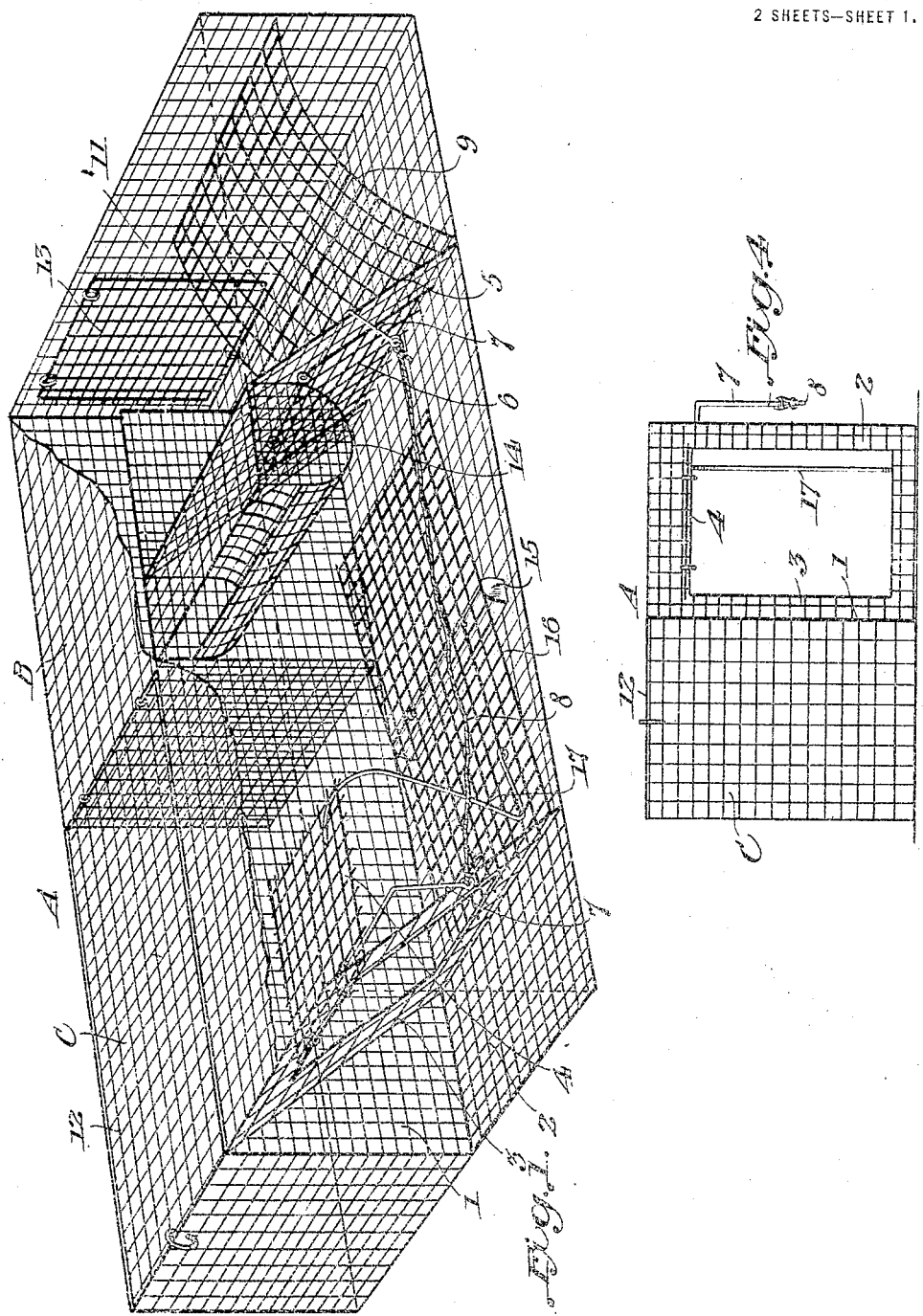

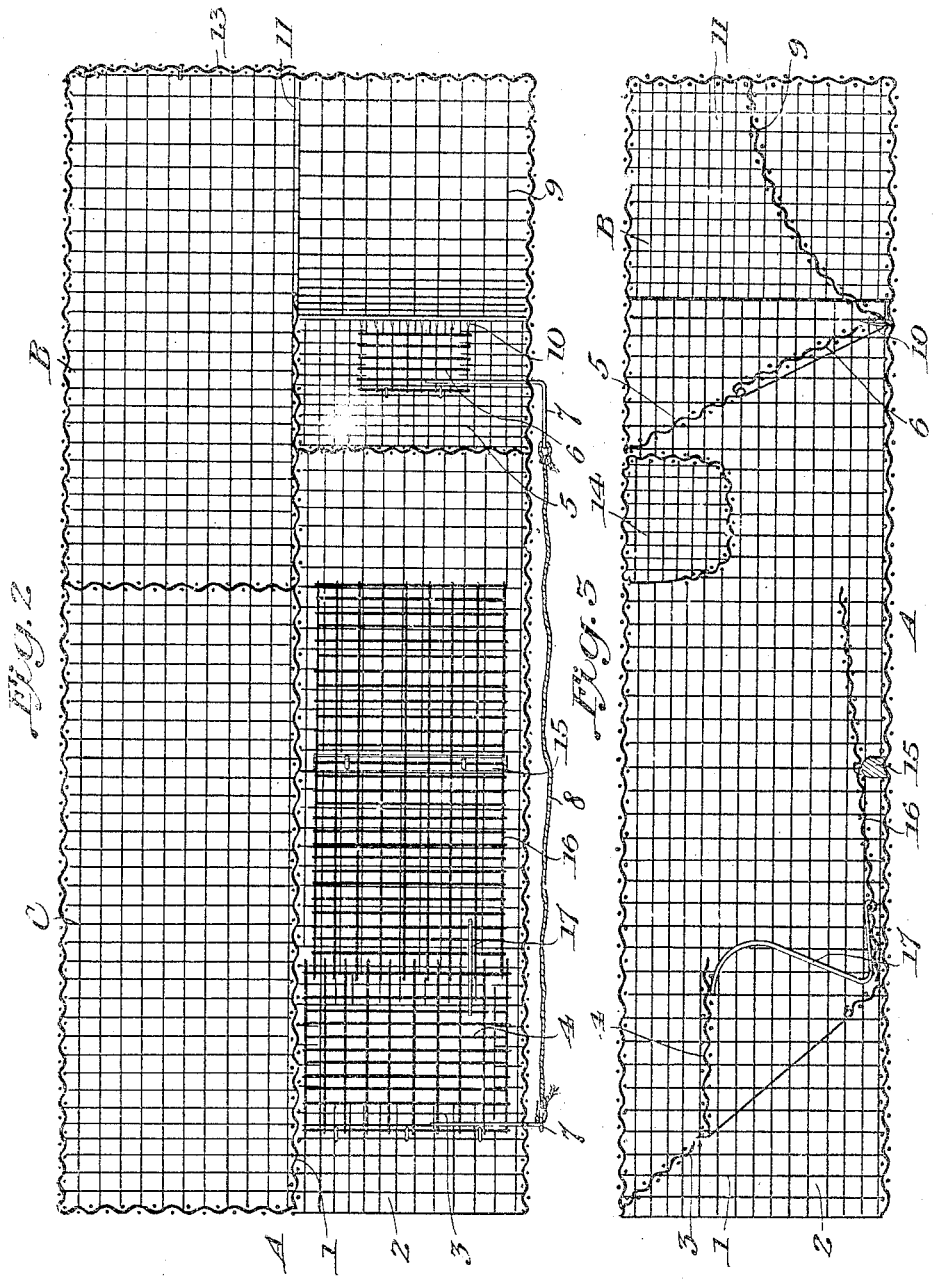

RUTHERFORD B. JAMES, OF ELLSWORTH, ILLINOIS.

ANIMAL-TRAP.

1,258,011.  Specification of Letters Patent.  Patented Mar. 5, 1918.

Application filed December 7, 1914. Serial No. 875,862.

*To all whom it may concern:*

Be it known that I, RUTHERFORD B. JAMES, a citizen of the United States, residing at Ellsworth, in county of McLean and State of Illinois, have invented certain new and useful Improvements in Animal-Traps, of which the following is a specification.

This invention relates to an improvement in animal traps, and the object is to provide means for setting the door in an open position by the animal after it enters the trap, and as it is entering another compartment.

A further object is in the provision of means for preventing the opening of the inner door after having passed through the same.

The invention consists of certain novel features of construction and combinations of parts which will be hereinafter described and pointed out in the claim.

In the accompanying drawings:

Figure 1 is a top plan view with the cover removed;

Fig. 2 is a longitudinal sectional view;

Fig. 3 is a view in side elevation; and

Fig. 4 is a transverse sectional view.

A, represents the trap, which is preferably constructed of wire, and is provided with a longitudinal partition 1. The entrance or opening 2 has an inclined door frame 3 formed therein, to which a door 4 is pivotally connected. A similar door frame 5 is formed near the rear end of the frame, to which a door 6 is pivotally connected. Each of the doors 4 and 6 have a crank arm 7 connected thereto at their pivotal points, which arms project through the side of the frame and are connected together by a flexible means, such as a cord 8.

A curved or arch-shaped run-way 9 is formed at the rear end of the trap, which has its base located at the bottom of the inclined door-frame 5. This construction causes the door 6 to travel closely to the inclined or curved surface of the run-way for a considerable distance as it is swung to an open position, and it is necessary for the animal in passing the door to push it to its limit of movement, and when the animal once passes the door it is impossible for him to return. Sharp prongs 10 are formed at the bottom of the door 6 which prevents the animal from returning after he once starts through the door way. When the animal passes through the rear door, it will cause the re-setting of the trap. It is necessary that the animal, no matter how small, climb the elevation or runway 9, until the door has been raised high enough to set the front door, before he can pass through the rear door.

An opening or passage 11 is formed in the partition 1 to permit the animal to enter a compartment B on the opposite side of the partition. A compartment or chamber C is provided at one end of the chamber B for holding the bait. Doors or covers 12 and 13 are pivotally connected to the frame and extend over the compartment B and chamber C, respectively for forming a closure therefor.

A slot is formed in the top of the frame for the insertion of a bait holder 14, which is located in front of the door 6.

Pivotally mounted on a fulcrum 15 is a treadle 16. Connected to the treadle is an arm 17, the concave surface of which is engaged by the door 4 as it oscillates about its pivot, so that the raising of the door 4 will tend to raise one end of the treadle 16 and to rotate it about its axis 15, if necessary, until the door 4 and treadle 16 will have turned about their axes far enough to permit the arm 17 and treadle 16 to be released and drop down into a position beneath the door 4, so as to support and hold it in an open position. When the animal passes the fulcrum 15 the treadle will move downward causing the arm to move from under the door 4 allowing the door to swing to closed position thereby confining the animal within the trap. The animal in seeking an outlet will pass through the door 6, which will cause the door 4 to be swung inward, by the flexible connection 8 which connects the two doors together, and cause the door 6 to be raised and to slide past the end of arm 17, so as to be supported by the arm 17 and held in an elevated position.

From the foregoing it will be seen that a very simple trap is provided which can be manufactured at a small cost, and which is not liable to get out of order.

I claim:

In a rat trap, the combination with a frame, having a central partition and an inlet opening, of door frames formed on one side of the partition and doors horizontally pivoted thereon, crank arms connected to the doors, flexible means connecting the crank arms together, a treadle located near the inlet opening and provided with an arm which is adapted to automatically engage the entrance door for normally holding it in an elevated position, and disengaged therefrom upon the actuation of the treadle, and an arch-shaped runway having its base at the base of the innermost door-frame, so that the door will travel in proximity thereto as it is swung open, said partition having an opening therein whereby the animal may pass from the runway into the frame on the opposite side of the partition, said last mentioned door adapted to operate the other for causing it to be raised to an elevated position and engaged by the arm as said last mentioned door is swung open.

In testimony whereof I affix my signature, in the presence of two witnesses.

RUTHERFORD B. JAMES.

Witnesses:
GEO. R. SMITH,
OLIVE M. KIRKPATRICK.